(12) United States Patent
Rutledge, Sr. et al.

(10) Patent No.: US 8,062,463 B2
(45) Date of Patent: Nov. 22, 2011

(54) METHOD OF ASSEMBLING SUCKER RODS AND END FITTINGS

(75) Inventors: Russell P. Rutledge, Sr., Big Spring, TX (US); Russell P. Rutledge, Jr., Big Spring, TX (US); Richard D. Burchett, Coahoma, TX (US); Floyd L. Brownfield, Big Spring, TX (US)

(73) Assignee: Fiberod, Inc., Morton Grove, IL (US)

( * ) Notice: Subject to any disclaimer, the term of this patent is extended or adjusted under 35 U.S.C. 154(b) by 892 days.

(21) Appl. No.: 11/715,087

(22) Filed: Mar. 5, 2007

(65) Prior Publication Data
US 2008/0217914 A1    Sep. 11, 2008

(51) Int. Cl.
*B29C 65/00* (2006.01)
*B29C 47/00* (2006.01)
*B32B 37/00* (2006.01)
*C08J 5/00* (2006.01)
*B25G 3/34* (2006.01)
*F16B 11/00* (2006.01)
*F16B 12/04* (2006.01)
*F16L 13/00* (2006.01)
*G05G 1/12* (2006.01)

(52) U.S. Cl. .................. 156/289; 156/244.13; 156/293; 156/307.1; 403/268; 403/361

(58) Field of Classification Search .............. 156/91, 156/153, 157, 158, 242, 244.11, 244.13, 156/244.24, 278, 281, 289, 293, 294, 296, 156/303.1, 304.1, 304.2, 304.3, 304.6, 307.1, 156/307.3, 307.5, 307.7; 403/265, 267, 268, 403/269, 345, 361

See application file for complete search history.

(56) References Cited

U.S. PATENT DOCUMENTS

| | | | |
|---|---|---|---|
| 3,168,340 A | | 2/1965 | Howard |
| 4,315,699 A | | 2/1982 | Lusk |
| 4,360,288 A | | 11/1982 | Rutledge et al. |
| 4,401,396 A | * | 8/1983 | McKay ............... 403/13 |
| 4,430,018 A | * | 2/1984 | Fischer .............. 403/268 |
| 4,475,839 A | | 10/1984 | Strandberg |
| 4,563,391 A | * | 1/1986 | Tanner et al. ........ 428/365 |
| 4,597,688 A | * | 7/1986 | Pagan ................ 403/265 |
| 4,662,774 A | | 5/1987 | Morrow |
| RE32,865 E | | 2/1989 | Rutledge et al. |
| 4,822,201 A | | 4/1989 | Iwasaki et al. |
| 4,919,560 A | | 4/1990 | Rutledge et al. |

(Continued)

OTHER PUBLICATIONS

U.S. Patent & Trademark Office, Office Action in U.S. Appl. No. 11/715,088 (Dec. 30, 2010).

*Primary Examiner* — Philip C Tucker
*Assistant Examiner* — Brian R Slawski
(74) *Attorney, Agent, or Firm* — Leydig, Voit & Mayer, Ltd.

(57) ABSTRACT

An improved design and a method of assembly of end fittings to sucker rods which may be of conventional length or continuous sucker rods is described herein. The end fittings and rods are assembled so as to form wedges which enhance the connectability of the end fitting to the rod, and further, the wedge or wedges approach the rod asymptotically so as to avoid any abrupt discontinuities in the wedge or wedges thus substantially eliminating stress concentration areas and potential failure areas in the rod. The assembly method provides for integrity in the rod to end fitting assembly to promote longer connection life and fewer shop rejections and field failures.

12 Claims, 4 Drawing Sheets

U.S. PATENT DOCUMENTS

| | | | |
|---|---|---|---|
| 5,088,638 A * | 2/1992 | Karaev et al. | 228/112.1 |
| 5,253,946 A | 10/1993 | Watkins | |
| 6,193,431 B1 * | 2/2001 | Rutledge | 403/268 |
| 6,886,484 B2 * | 5/2005 | Thomas | 114/108 |
| 2005/0000689 A1 * | 1/2005 | Peleanu et al. | 166/279 |
| 2008/0217023 A1 | 9/2008 | Rutledge | |

* cited by examiner

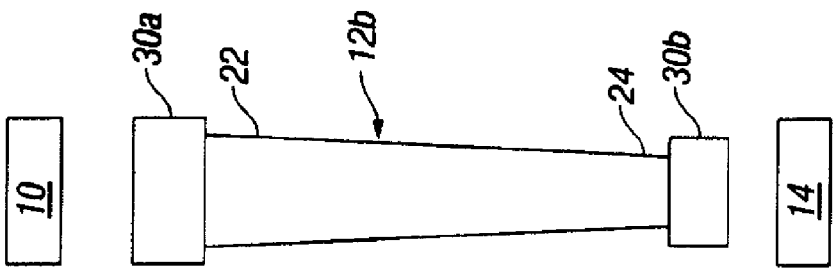
FIG. 7
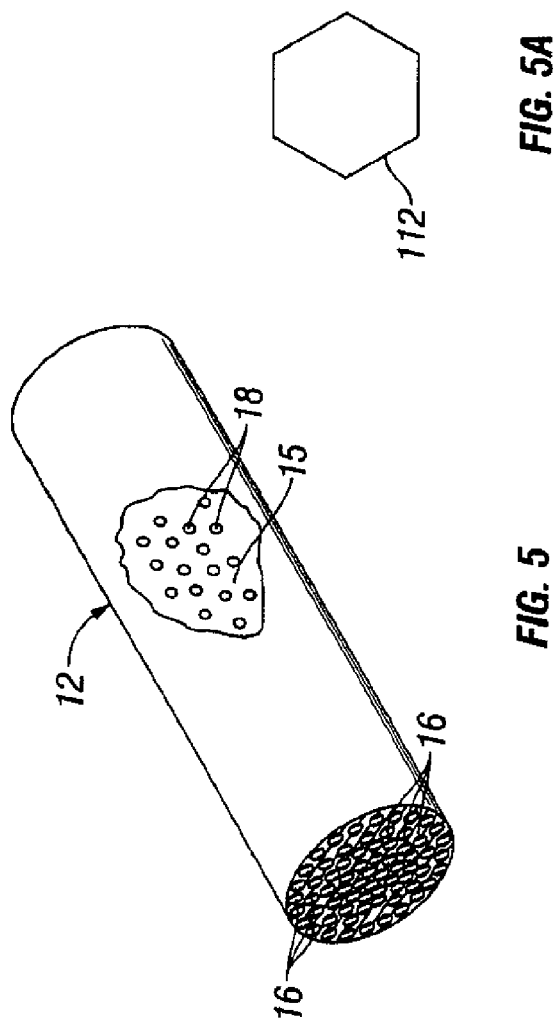
FIG. 5A
FIG. 5
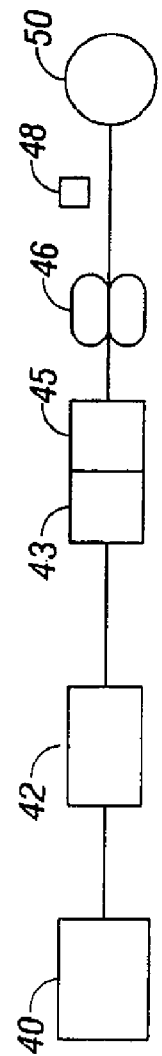
FIG. 6

US 8,062,463 B2

METHOD OF ASSEMBLING SUCKER RODS AND END FITTINGS

RELATED APPLICATION

This patent application is related to U.S. patent application Ser. No. 11/715,085, filed Mar. 5, 2007, entitled "Continuous Sucker Rod and Method of Using Same," issued as U.S. Pat. No. 7,730,938, and to U.S. application Ser. No. 12/794,298, filed Jun. 4, 2010 which is a divisional of U.S. application Ser. No. 11/715,085, and is related to U.S. patent application Ser. No. 11/715,088, filed Mar. 5, 2007, entitled "Improved Sucker Rod End Fittings and Method of Using Same."

TECHNICAL FIELD

The present invention relates to oilfield production, and more particularly, to the assembly of fiberglass or composite sucker rods including the end-fittings in conjunction with downhole pumps and surface located pump actuation systems.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers.

FIG. 5 illustrates a side view partially in cross-section of a portion of a sucker rod according to the present invention;

FIG. 5A illustrates a bottom cross-sectional view of a sucker rod outer shape in accordance with the present invention;

FIG. 6 illustrates, in flow chart form, the process for manufacturing a continuous sucker rod in accordance with the present invention; and FIG. 7 illustrates a side view partially in cross-section of an alternative embodiment of a portion of a sucker rod according to the present invention.

DETAILED DESCRIPTION OF EMBODIMENTS OF THE INVENTION

Figure 1:
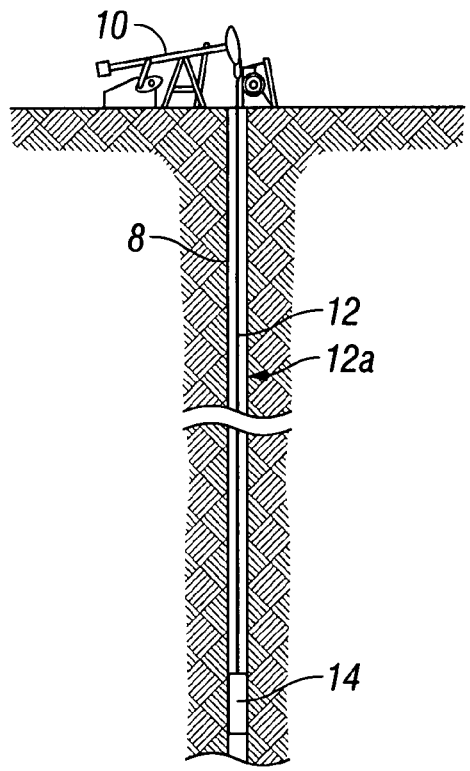
FIG. 1 illustrates a side elevated view partially in cross-section of a wellbore having a sucker rod string attached between a pump and a pump drive according to the present invention.

It is well known in the art to use sucker rods to actuate a downhole pump to recover oil from a wellbore. Typically, a series of sucker rods are connected end to end to form a sucker rod string, which extends from the pump drive 10 to the pump 14 (FIG. 1). It should be appreciated that pump drive 10 is typically a pump jack (i.e. a beam pump system) or other known pump drive. Further, downhole pump 14 is typically a conventional pump well known in the art. It should be appreciated that although fiberglass or composite sucker rods are light weight, they are typically connected by metallic end fittings 30 which add to the weight of the string and can be a considerable factor in a very deep wellbore as the pump drive must overcome the weight of the sucker rod string, including the metallic end fittings 30 in order to acuate the downhole pump 14.

Figures 4, 4A:
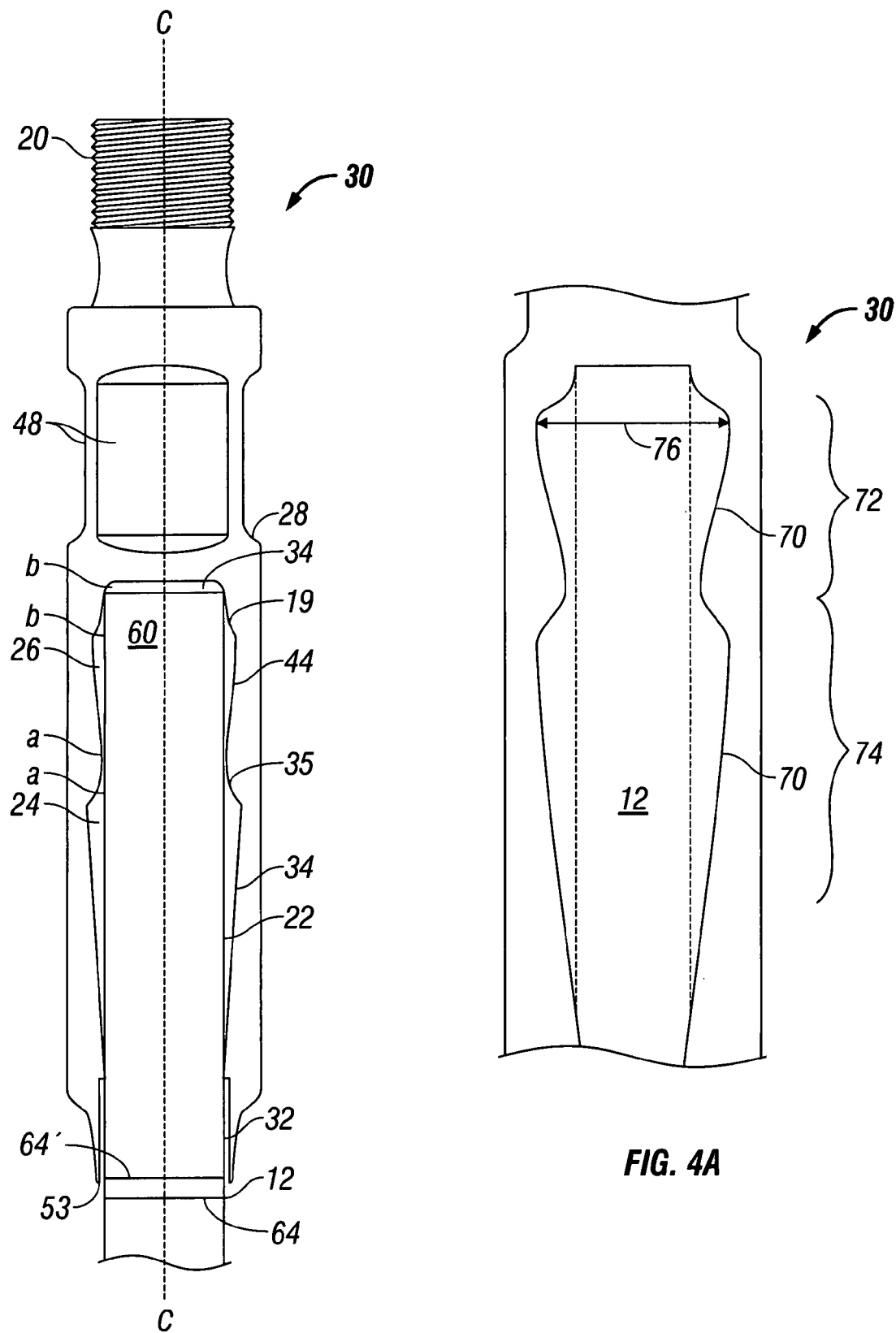
FIG. 4 illustrates a side elevated view, partially in cross-section, of a sucker rod end fitting in accordance with the present invention.
FIG. 4A illustrates a side elevated cross-sectional view of an improved sucker rod end fitting in accordance with the present invention.

It should be appreciated that the sucker rod string can be made up of many rods that are approximately thirty-seven (37) feet in length, the string can comprise one single continuous rod, or a few continuous rods which can be hundreds of feet in length or even a thousand or more feet in length. Regardless of the length of the sucker rod, it is preferably assembled, as described herein, with an end-fitting 30 as illustrated in FIG. 4 or 4A.

FIG. 1 illustrates a typical pumping system wherein the pump drive 10 is a conventional beam pump or pump jack and is connected to a downhole pump 14 through the sucker rod string 12a inserted into wellbore 8. The sucker rod string 12a can comprise a continuous sucker rod which extends from downhole pump 14 to pump drive 10, a series of connected continuous rods, a series of conventional length rods connected together, or any combination thereof Preferably, the sucker rod 12 is a fiberglass or composite rod. It should be understood that, as described herein, the sucker rod string 12a may be the same as the continuous sucker rod 12 when the continuous sucker rod 12 is a one piece rod that extends substantially between the pump drive 10 and the sub-surface pump 14.

Figure 2:
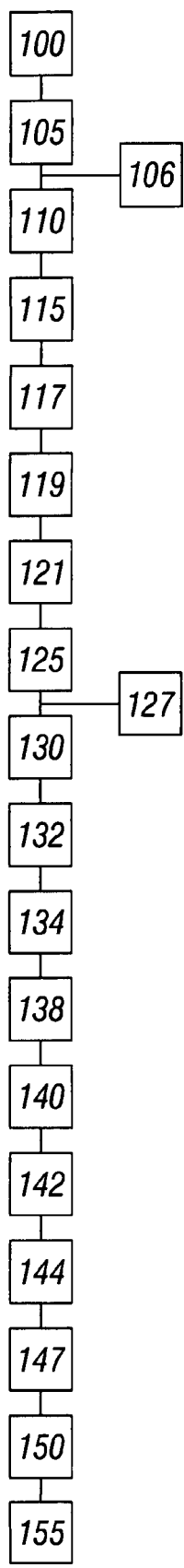
FIG. 2 illustrates a flow chart of assembling a sucker rod and end fitting.
Figure 3:
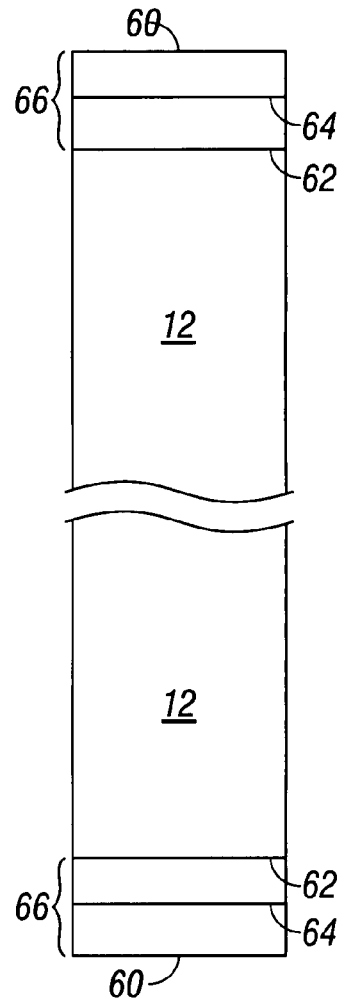
FIG. 3 illustrates a partial side view of an embodiment of a sucker rod further illustrating gauge marks for assembly according to the present invention.

Referring now to FIGS. 2 and 3, typically, a sucker rod 12 and its corresponding end fittings 30 are separately prepared, assembled together, and tested for the integrity of the end fitting 30 to rod 12 connection. FIG. 2 illustrates a flow chart corresponding to the steps of preparing and assembling the end fitting 30 and the rod 12. FIG. 3 illustrates the rod 12 and corresponding elements described hereinbelow. When the end fittings 30 are manufactured 100, they are preferably inspected 105, per in-house quality control for proper tolerancing. It should be appreciated that proper tolerancing refers to the particular design specifications to which the end fitting 30 is manufactured to. It should further be understood that quality control inspection, of the tolerances, can also be performed at the manufacturing facility, or by third party inspectors. If the end fittings 30 pass the inspection criteria, they are advanced to the next step 110. The dimensionally acceptable end fittings 30 may also be placed in inventory for future manufacturing needs. Typically, if the end fittings 30 do not pass the dimensional and/or tolerancing inspection they may be returned 106 to the manufacturer, scraped, repaired (i.e. welded and or machined so as to meet the required dimensional/tolerancing criteria) or any combination thereof. It should be understood, by those in the art, that the dimensional/tolerancing inspection can be performed on each individual end fitting 30 or on some pre-determined portion of end fittings selected by some statistical sampling method.

Next 110 the end fittings 30 are cleaned. The cleaning operation preferably comprises at least one wash. However, the end fittings 30 may be cleaned by any variety of conventional methods to remove dirt, scale, oil/grease, or other contaminants that may have settled on the surfaces of the end fitting 30. It should be appreciated that the cleaning step 110 may also include the detection and removal of burrs, metal shavings, or other abnormalities left from manufacturing. It should be further appreciated that the cleaning step 110 can be manually or automatically performed.

After the cleaning step 110, the end fittings 30 are positioned, at step 115, so as to allow the introduction of a mold release agent into the end fitting 30. It should be understood that the mold release agent can be a variety of conventional mold release agents. The mold release agent will prevent the bonding of the end fitting 30 metal material with the adhesive that is used to connect the end fitting 30 with the rod end 60. It will be more fully understood, as discussed hereinbelow, that this novel method of assembly does not rely on the chemical adhesion of the end fitting 30 to the rod 12 but rather a mechanical action. Thus, the purpose of the mold release agent will become apparent hereinbelow.

Preferably, to apply the mold release agent, the cleaned end fittings 30 are turned upside down, so that the mold release agent can be poured into the end fitting 30. Preferably, the entire end fitting 30 is filled with the mold release agent and allowed to stand 117. Preferably, the end fittings 30 are left for about 3 or 4 minutes. However, the standing time may vary and should not be viewed as a limitation herein. It is foreseeable, that as the assembly becomes more automated, more technically advanced, and as different mold release agents are developed and tested, the standing time may vary to a more precise time and other steps may be integrated such as, but not limited to, spray applications, heated applications, cold applications, or any combination therein. After the standing time, the mold release agent is poured out of the end fitting 30. It should be appreciated that if some type of spray application is utilized, the pouring out and/our the standing time may change or be eliminated. It should be understood, that after the mold release agent has been poured out, the end fitting 30 should be allowed to stand so as to allow substantially all the remaining release agent to dry.

After the access mold release agent has been poured out 119, the coated end-fittings 30 are preferably placed into a heated environment 121 such as, but not limited to, an oven. The oven can be a conventional oven used for metal treatment such as stress relieving or heat treatment. Preferably, the end fitting 30 will remain in the heated environment, such as an oven until it reaches a temperature of about 150 degrees F. It should be understood that the exact temperature may vary due to the mold release agent's manufacturer's curing recommendations, the exact type of mold release, the type of material used in manufacturing the end fitting 30, or other factors relating to the curing process. After the curing, the end fittings 30 can be moved to a staging area or into an inventory storage area in preparation of assembly with a sucker rod end 60.

The sucker rods 12, onto which the end fittings 30 will be assembled, are inspected 125 after being formed. It should be appreciated that the preferable manner of manufacturing the sucker rod 12 is through pulltrusion. However, other methods of manufacturing are visualized and should not be viewed as a limitation thereof. Preferably, the rejected rod bodies 12 are separated for scrap or repair. Preferably, the next step 130 is to properly gauge and mark the rod body ends 60, which will be receiving the end fittings 30. Preferably, two gauge marks are made, on each end 60 to be assembled with an end fitting 30. One mark 62 is to indicate the length of the area to be sanded 66. The second gauge mark 64 is to indicate the proper position of the end fitting 30 after it has been placed onto the sanded end 60 as explained in more detail hereinbelow. It should be appreciated that the position of the marks is a function of the rod body 12 diameter and the size of the end fitting 30, which will be applied. The placement of the gauge marks 62, 64 can be determined by measuring or by the use of a gauge to increase repeatability and accuracy of the mark placement. The marks 62, 64 can be made in a variety of conventional manners but it is preferable that the mark 62, 64 is on the rod 12 surface, such as but not limited to, a paint mark or ink mark. Although light scribe marks may be acceptable, care should be taken not to deeply scratch of gouge the surface and the light scribe marks may be difficult to see during other operations. Further, because at least one of the gauge marks 62, 64 must be visible after a heat cure step, the mark 62, 64 must be of a type to withstand higher temperatures. The accepted rod bodies 12 are preferably moved to a sanding area 132.

Preferably, the rods 12 are sanded on the ends 60, that will accept the end fittings 30. In one embodiment, the rod ends 60 are sanded in a machine. In another embodiment the rod ends 60 are sand blasted and in yet another embodiment the sanding is done manually. It should be appreciated that the step of machine sanding is more accurate and preferably results in a lower reject rate after the assembly of the rod end 60 and the end fitting 30, both during inspection and during field operation. It should further be appreciated that the machine sanding can be further carried out by full automation or by a combination of automation and manual sanding. The combination of automation and manual sanding comprises a machine which rotates the rod bodies 12, about their longitudinal axis, and the ends 60 are manually sanded. Preferably, the manual sanding, whether aided by a machine or completely performed manually, is done using a 50 grit sand paper. However, it should be appreciated that the grit of sandpaper can be varied. Preferably, the sanding step 132 will allow for a better more thorough bonding between the adhesive and the rod body 12. It should be apparent, from the description above, and as further detailed below, that the adhesive must bond with the rod end 60 but should not bond with the end fitting 30.

After the rod ends 60 have been sanded 132, the sanded ends 60 are preferably cleaned 134 to provide a good surface for adhesion. Preferably, the sanded ends 60 are washed with alcohol. However, a variety of conventional cleaners or chemicals can be utilized as long as they do not interfere with nor compromise the base material of the rod body 12. After the ends 60 have been cleaned and have dried, the rod bodies 12 are preferably ready for the step of assembling the rod body 12 and the end fitting 30.

The assembly step 138 comprises filling the previously prepared end fittings 30 with a pre-determined amount of adhesive. It should be appreciated that the adhesive is of a conventional kind to bond to the material of the rod body 12. However, other adhesives may be acceptable and the selection of a particular adhesive should not be viewed as a limitation herein. Once the adhesive has been placed in the end fitting 30, the end fitting 30 is placed onto the rod body end 60.

Preferably, the end fittings 30 are applied manually and then properly positioned on the rod end 60 by means of a manual tool. Preferably, the end fittings 30 are positioned so as to be aligned with the second gauge mark 64 to ensure that it has bottomed out, i.e. that the rod end 60 is fully inserted into the end fitting 30 yet still creating the necessary cavity 24, 26 (see FIG. 4) between the internal surface of the end fitting 30 and the external surface of the rod end. It has been found that if the end fittings 30 are rotated on to the rod end 60, the adhesive is more evenly distributed between the rod end 60 surface and the internal surface of the end fitting 30. Preferably, the assembly tool allows the end fitting 30 to be accurately and repeatedly positioned for each application. It should be appreciated that other methods of placing the end fitting 30 onto the rod end 60 are possible. These may include, but are not limited to, the use of a conventional drill, such as a pneumatic, hydraulic, or air drill, for high speed rotation, using a machine to rotate either or both the rod body 12 and the end fitting 30, or a variety of other means of which would allow for the proper positioning of the end fitting 30, with respect to the rod end 60, while maintaining a thorough and even distribution of the adhesive within the cavity 24, 26 formed between the interior of the end fitting 30 and the external surface of the rod end 60. It should be understood that in order for the rod body 12 and the end fitting 30 to remain assembled, through the life time of the sucker rod 12, the amount of and the distribution of the adhesive, in the cavity 24, 26 formed between the interior of the end fitting 30 and the external surface of the rod end 60 is very important. Thus, the manner of placing the end fitting 30 onto the rod end 60 is very important. An improper assembly method, would displace too much adhesive, i.e. force too much adhesive out of the cavity 24, 26 formed between the interior of the end fitting 30 and the external surface of the rod end 60. This over displacement, of adhesive, may result in voids, within the cured adhesive, or a lack of sufficient cured adhesive volume and thus compromise or destroy the mechanical bonding between the rod body 12 and the end fitting 30. It should be further appreciated that if the adhesive is not thoroughly and evenly distributed or if too much adhesive has been displaced, causing voids or air pockets, a hydraulicing effect may result during curing. This hydraulicing effect pushes the end fitting 30 in a direction toward the end of the sanded area 66. It should be appreciated that such a phenomenon is not wanted as it causes for an improper or poor assembly between the rod body 12 and the end fitting 30 which can result in an inspection failure of the rod 12 or cause a more expensive and dangerous premature failing of the sucker rod 12 in the field. Thus, the second gauge mark 64, is also used to visibly inspect for any movement of the end fitting 30 during the curing stage. The purpose and advantage of this mechanical bond is explained in more detail herein.

After the end fittings 30 have been properly fitted 138 onto the rod body ends 60, they are preferably heat cured 140 to assure the proper adhesion between the adhesive, in the end fittings 30 and the rod end 60. There are a variety of methods and means to heat cure the adhesive. Preferably, the adhesive, along with the rod end 60 and fitting 30, are preheated until the adhesive reaches a temperature of about 350 degrees F. It should be appreciated that various heating technologies are available to reach this pre-heat temperature very quickly. One such method is the use of incandescent tubes that have a temperature of about 1300 degrees F. The high temperature of the tubes coupled with a flash stone allow the adhesive temperature to reach 350 degrees F. in less than two minutes. The preheated rod ends 60 and end fittings 30 are then preferably placed in a heated environment such as, but not limited to, a convection oven where the 350 degree F. temperature can be maintained. Preferably, the rod 12 and end fitting 30 assembly is cured, in the heated environment for at least one hour. It should be understood, by those skilled in the art, that the curing time and temperature may vary depending on factors such as, but not limited to, the type/brand of adhesive, the material of the rod bodies 12, the material of the fittings 30, the size of the rod 12, the availability of the flash heating, the ambient temperature and humidity, and the type of heating environment being used.

It should be understood that it is preferable to keep track of the time and temperature of the curing process. This can be done in a variety of ways from using sophisticated chart recorders or computer controls or can be much simpler by manually recording the time and temperature. It should be appreciated that regardless of the means of tracking the curing cycle, the rods 12 can be heated in batches or individually.

At step 142, the rod bodies 12 and the attached end fittings 30 are removed from the heating environment and are inspected. As briefly touched on hereinabove, one of the possible defects is the hydraulicing effect resulting fro air and/or moisture being trapped in the adhesive. This hydraulicing effect will tend to force the end fitting 30 to move off of the rod body 12. Because of the second gauge mark 64, the end fittings 30 can be quickly checked, through a visual inspection, for any indication that the end fitting 30 has moved i.e. any separation between the second gauge mark 64 and the end fitting 30 would indicate the movement of the end fitting 30.

At step 144, the rods 12 and end fittings 30 are allowed to cool and then are prepared for further inspection.

At step 147, the cooled rods 12 are pull tested to both set the mechanical wedge bond (explained in more detail hereinbelow) between the adhesive and the end fitting 30. It should be understood that the pull test is to create and then to check the integrity of the mechanical bond between the rod body 12 and the end fitting 30. It should be further understood, that after curing 140 and cooling down 144, the end fittings 30 will be loose and capable of spinning about the rod end 60. This spinning is, at least partially, due to the bonding of the adhesive to the rod body 12 but not to the end fitting 30 due to the mold release applied to the interior of the end fitting 30. However, the fittings 30 will not come off the rod end 60 due to the geometry of the fitting 30 and the adhesive filled cavity 24, 26 between the end of the rod 60 and the end fitting 30. Preferably, the pull test is conducted at a pre-determined pressure corresponding to the diameter of the sucker rod 12. As the pressure is applied, in a direction so as to move the end fitting 30 away from the rod body 12, the adhesive, which has bonded to the rod body 12 but not to the end fitting 30, is deformed, by the end fitting 30, thus creating a wedge-type mechanical bond between the end fitting 30 and the rod body 12. The remaining portion of the pull test is to verify the integrity of the newly created mechanical bond so as to ensure that the rod 12 and the end fitting 30 are not separated during use. It should be appreciated, by those in the art, that after the pull test, the end fitting 30 will remain stationary and will not move nor spin about the rod body end 60.

At step 150, the assembled sucker rods 12 and end fittings 30 are visually inspected for a proper assembly. Preferably, if the end fittings 30 have been correctly bonded, the end fitting 30 will move about one-eighth (⅛) of an inch in the direction of the pull test (i.e. the rod end 60). This movement can be detected visually since the adhesive, when originally applied and cured, forms a "mark" 64' at the original position of the end fitting 30. Preferably mark 64' and mark 64 are the same but it should be appreciated that the gauge mark 64 may no longer be visible and thus the adhesive created mark 64' would be come the next gauge mark. This "mark" 64' is formed when the adhesive dried at the end of the end fitting 30 after the original positioning of the end fitting 30. Thus, as the end fitting 30 moves, during the pull test, to form the cured adhesive into a wedge, the adhesive line becomes visible, thus allowing for an easy visual indication of how much the end fitting 30 actually moved.

Next, at step 155, the assembled sucker rod 12 can be prepared for shipment, use, or storage. It should be appreciated that several conventional steps can be performed, such as, but not limited to, applying thread protectors to the end fittings 30, coating the end fittings 30 with a rust inhibitor, additional quality control checks or inspections, painting, crating, or inventorying the finished product.

It should be appreciated that the above described steps do not need to be performed in the exact sequence described. Some steps, such as the preparation of the end fitting 30 and the preparation of the rod ends 60 can be done simultaneously. With the same regard, the inspection and assembly steps may be done in the same area or the parts may be moved to specific areas for performing specific steps. It should be further appreciated that a variety of means may be employed to achieve the same result without departing from the spirit of the invention described herein.

For purposes of the present disclosure, the term "wave," "wave-shaped," "sine-wave" or "S-shaped" refers to the asymptotic character of the curvature of the present transition surfaces. Asymptotic curvature may be understood by distinguishing it from tangential or arcuate curvature. A tangential or arcuate curve retains the potential to intersect with or contact the outer surface of the rod 12 if the curve is sufficiently extrapolated. An asymptotic curve, by contrast, is an infinite regression that will not intersect with the rod 12 regardless of any extrapolation of the curve. Any curvature of an annular transition surface that is not asymptotic will create an abrupt discontinuity in the wedge formed thereby, possibly resulting in the spiking of destructive forces into the rod body 12.

FIGS. 4 and 4A illustrate the end fitting 30, which can be mounted on any sucker rod whether continuous, or of commercial length, or any length therebetween. The sucker rod 12 is preferably inserted into the bottom end fitting chamber 32. It should be understood that the cross-sectional shape of the end fitting 30 should substantially match the cross-sectional shape of the sucker rod 12. For example, not intended as limiting, if the sucker rod 12 cross-section is substantially circular, the cross-sectional shape of the bottom chamber 32 of the end fitting 30 would be substantially circular. For a further example, not intended as limiting, if the sucker rod 12 cross-section is substantially polygonal, the cross-sectional shape of the bottom chamber 32 of the end fitting 30 would be substantially polygonal. However, it is foreseeable for the cross sectional shape of the chamber 32 and the cross-sectional shape of the rod to be different. In most cases of such a cross-sectional mismatch, the cross-sectional shape of the bottom chamber 32 will most likely be circular. It should be further understood that the end fittings 30 may be attached, to a sucker rod 12, while the rod 12 is stored on the reel (if it is a continuous sucker rod) or may be attached at a field location. The preferred end fittings 30, as described hereinbelow, enable the use of the presently described sucker rod 12 as the preferred end fittings 30 prevent separation from the sucker rod 12 as well as prevent the damage, breaking, or fracturing the rod 12. Thus, the rod 12, with the preferred end fittings 30, has a useable stroking life that exceeds conventional sucker rods and their conventional end fittings.

Among the mechanical forces acting on the rod/adhesive/metal interface, are compressive forces, such as during a stroke of the pump either up or down, and negative load forces. Negative load refers to forces acting on the side of the wedge opposite from the gripping side of the wedge. This negative loading may be a result of gas pressures in the well, a sticking pump, or some other interference with the movement of the sucker rod. The negative loading may cause the sucker rod to be pushed downward, which causes a compressive force on the wedges. This compressive force, if sufficient or frequent will act to shear the adhesive wedge and destroy the connection. As explained herein, the preferable loading force on the wedges is a tension force wherein the wedges are resisting the movement of the rod away from the end fitting 30. Negative load may be very destructive to the wedges of prior art designs, causing catastrophic shear failure of the wedge. In the present invention, however, when a shock load occurs that creates a negative load, the wedge has the ability to absorb the negative load forces and to thereby resist failure of the rod connection. Wedges transmit the compressive and tensile forces of pumping from the steel connector or end fitting to the fiberglass rod and vice-versa. The metal end fitting 30 is harder than the hardened adhesive, and deforms the shape of the hardened adhesive wedge. Essentially, the metal end fitting 30 squeezes the deformations in the adhesive when compressive and back travel forces are applied to the construction. Ideally, the deformations are squeezed by the end fitting 30 out toward the end of the rod, transmitting the forces, at least to some extent, into the metal end fitting 30 for optimum dispersal of destructive forces.

Axial forces applied to a rod cause deformations of the rod material. The deformations are transmitted throughout the rod body 12 and vary depending on the magnitude of the force and the cross-sectional area of the rod 12. Abrupt changes in the cross-sectional area of the rod 12 concentrate stress forces in certain areas of the rod 12. The wedges of sucker rod 12 connections change the cross-sectional area of the rod 12 in comparison to the rod body 12 in such a way as to concentrate stress forces on the rod 12. The concentrated forces may exceed the structural strength of the composite material of the rod 12, resulting in rod 12 failure from cracking or splintering. Early rod 12 designs were plagued with premature failure. Failure analysis of these early designs revealed that failure, while exhibiting itself catastrophically, is rarely a result of a catastrophic event. The exhibition of catastrophic failure is usually a result of improper maintenance and materials handling procedures. Further, the failure, regardless of its manifestation, can be linked to the interface between the fiberglass rod 12 and the metal end fitting 30. It was still further found that the end fitting 30 designs that distribute applied stresses more fully along the length of the interface are more successful in reducing failure.

Therefore, the preferred sucker rod 12 connectors, such as illustrated in FIG. 4, achieve a smooth and continuous dispersal of forces along the rod-connector interface to avoid the concentration of forces thereon in excess of the rod 12 strength, while at the same time providing a cooperative engagement of the connector and the rod 12 to prevent pull-outs. After a rod 12 is inserted into the receptacle 32 (see FIG. 2, step 138), the adhesive fills the void space in the wedges or annuluses of the interior surface of the receptacle 32. The initially flowable adhesive cures or hardens becoming a solid and adhering to the rod 12. The adhesive bonds to the rod 12 and not to the inside of the metal receptacle 32. When the assembled rod 12 is pulled in tension in its connector 30, the solid adhesive wedges bonded to the rod 12 press against the complimentary form of the interior of the end fitting 30 and force the end fitting 30 against the annular wedges of the solid adhesive. A compressive force is imparted to the rod 12 itself as the metal connector and the adhesive wedge press against each other to resist any further slippage. This force of compression is applied across the entire surface where the adhesive wedge and the metal surface contact. The wedge acts to engage the end fitting 30 to prevent pullouts and to disperse the destructive forces evenly throughout the rod/adhesive/metal interface, ideally directing the forces toward the end of the rod 60 and even into the metal end fitting 30.

The contours of the wedges on the interior surface of the end fitting 30 affect the shape of the distortion in the shape of the adhesive material. The distortion travels through the adhesive, impelled by the mechanical stress and strain forces acting on the end fitting 30. Specifically, the shape of the distortion approximates the shape of the wedges. If the wedges have an abrupt change of cross sectional area such as a point of transition from one wedge to the next successive wedge, the shape of the abrupt change will be echoed in the shape of the distortion, with the result that the distortion takes on a "spiked" shape. The spike is a manifestation of the concentration of force caused by the abrupt discontinuity in the wedges. Such concentrated forces may exceed the material strength of the rod 12, particularly where the spike is impelled into the rod 12 at the interface of the rod 12 and the adhesive. Inadequacies in the stress distribution dynamic lead to localized and intense stress risers that can overcome the properties of the rod/adhesive/metal interface to adequately distribute the applied load(s), resulting in the loss of integrity of the interface system. Additionally, the cumulative effect of repetitive stress risers aggravate the loss of integrity, thus accelerating the erosion of the affected area. Thus, any attempt to minimize the destructive forces leading to catastrophic failure must be focused on the sucker rod/adhesive/metal interface.

In any end fitting 30 design, the principle of the wedge is employed to provide capture of the fiberglass rod 12 and distribution of the applied forces encountered in field use. The wedge is formed by a rod receptacle having an interior surface shaped to form at least one generally wedge-shaped annulus between the interior surface of the receptacle and the end of the rod 12 received by the receptacle. The wedge-shaped annulus has an annularly thin portion and an annularly thick portion distal to the thin portion. Examples of end fitting 30 designs include from five wedges (being the earliest designs) to one wedge. In each design, the shape (or shapes) of the wedge (or wedges) is/are determined by the diameter of the sucker rod 12, the diameter of the pocket (receptacle) of the end fitting 30, and the length of each wedge section. In all cases, areas of discontinuity and abrupt changes in the shape of the pocket lead to high stress levels, as revealed by stress analysis of the particular system. Examination of the stress distribution, or lack thereof, reveals that these areas of high stress concentration are a product of the shape and size of the discontinuity of the end fitting 30 pocket. These areas lead to destruction of the rod/adhesive layer, leading to catastrophic failure as described above.

In the present invention, the shape of the annular wedge or wedges (formed by the cooperation of the rod receptacle or end fitting 30 and the rod 12 received therein) is wave-shaped where the thick portion of the annulus or wedge approaches the rod body 12 distal to the thin portion of the annulus or wedge. That is, the annularly thick portion of the annulus approaches the end of the rod 60 asymptotically so that there is no abrupt discontinuity in the shape of the wedge or from one wedge to the next. Computer models comparing various rod connector constructions (including a metal end fitting 30 or rod receptacle, a fiberglass rod 12, and a hardened, initially flowable, adhesive) of various wedge designs, including that of the present invention, demonstrate that a rod connection of the present invention disperses or directs the forces acting on the connection, and particularly acting on the fiberglass rod 12, so that there is effectively no spiking of such forces into the rod body 12. Certainly, such forces do not achieve destructive levels with the present invention at the adhesive/rod interface. Unlike other wedge designs examined by computer modeling, the present invention at least partially directs the stress forces acting on the connection into the metal end fitting 30 itself, a result unique to the present invention. The computer modeling is discussed more fully in U.S. Pat. No. 6,193,431 B1, which is incorporated by reference herein.

The wave-shaped transition surfaces of the present end fitting 30 avoid any abrupt discontinuity in the curvature of the fittings 30 internal surface to avoid any excessive concentration of mechanical forces upon the rod 12 that would otherwise result in rod 12 failure, and yet still provide sufficient wedge-capture upon the application of forces to assure a reliable cooperating grip between the end fitting 30 and the adhesive wedge (or wedges).

Still referring to FIG. 4, the preferred end fitting 30 comprises an end connector 20 which may be adapted to connect either to the pump drive 10 or polished rod, the downhole pump 14 or sinker bars, other sucker rods, or any other desired connection. It should therefore be appreciated that although connection 20 is illustrated having a threaded end, other forms of connection, including but not limited to a box thread connection, a quick coupling, or any other method of attachment can be used.

As shown in FIG. 4, the end fitting 30 is formed to define an axial receptacle 32 for receiving an end of the sucker rod 12. The axial receptacle 32 is defined by a series of outwardly converging tapered surfaces 34, 44 which cooperate with the external cylindrical surface 22 of the rod 12 to further define a plurality of a wedge shaped or tapered annuluses 24, 26 about the rod 12 when the rod 12 is in position. The end fitting 30 includes an external substantially cylindrical surface 28 terminating in an externally threaded end 20. End fitting 30 also includes a pair of diametrically opposite flat surfaces 48 for enabling an oil field operator to attach a standard sucker rod wrench thereto for connecting and/or disconnecting the individual sucker rod end fittings 30 from one another.

As described hereinabove, the sucker rod end fitting 30 includes a sufficient quantity of adhesive material to completely fill the annuluses 24, 26 defined by the first connector member outwardly converging tapered surfaces 34, 44 and the outer cylindrical surface of the rod 22 for adhering or otherwise interconnecting the rod 12 to the connector member 30. When the rod 12 is inserted into the receptacle 32, it displaces much of the liquid adhesive and forces it into the annulus 24, 26 surrounding the rod 12, where it subsequently cures, forming an angular wedge which is bonded to the rod 12 and the receptacle tapered surface 34, 44.

The cured adhesive material forms a sleeve having a series of annular tapering surfaces defining a series of annular wedges positioned between the rod 12 and the receptacle tapered surfaces 34, 44. This hardened adhesive sleeve forms a bond with the sucker rod 12 to resist the shear force resulting when tension is applied to the rod 12, as if to withdraw it from the end fitting 30. Additionally, tension applied to the rod 12 causes the annular wedges of cured adhesive material to be forced into compressive engagement with the rod outer cylindrical surface 28 and with the connector member tapered surfaces 34, 44. This results in a compression force directed radially inwardly to the center line axis c-c of the end fitting 30 to compress the annular wedges of adhesive material against the rod 12 to retain the rod 12 in position within the connector member 30 against the action of such tension applied to the rod 12.

To avoid the concentration of excessive force on the rod 12 from such compression, the wedges must be formed such that there are no abrupt changes in the cross-sectional area of the sleeve. The desired effect of the wedges on the stress forces acting on them is to disperse the forces, not to concentrate them. The cross-sectional area of the sleeve must change as smoothly as possible so that compressive forces are dispersed equally along the end of the rod 12, and not concentrated excessively at any portion of the rod 12.

The sucker rod end fitting 30 of the present invention has an open axially outer end 53 and a closed axially inner end 33. A first annular surface or wedge 34 proximal to the open end 53 and a second annular surface or wedge 44 is distal to the open end, and proximal to the closed end 33. The transition surface 35 from said first annular surface 34 and the second annular surface 44 is defined by the region between lines a-a. Transition surface 35 of the receptacle 32 is formed in the shape of a wave having an outward tapered portion nearer said open end 53 and inward tapered portion nearer the closed end 33. The transition portion 35 does not curve concavely to meet the exterior surface of the rod 22, but curves asymptotically so that the surface 35 approaches the cylindrical rod surface 22 asymptotically rather then arcuately or tangentially. The distinction between asymptotic curvature versus arcuate or tangential curvature should be appreciated as explained hereinabove. Any curvature of an annular transition surface that is not asymptotic will create an abrupt discontinuity in the wedge formed thereby, possibly resulting in the spiking of destructive forces on the rod body 12. Thus, the cross-section of surface 35 is preferably S-shaped, sine-waved shaped, or simply wave-shaped, in reference to the asymptotic character of the curvature of the transition surface.

The wave-shaped transition surface 35 smooths out the transition from the proximal annulus to the distal annulus and achieves the desired effect of avoiding spiking of stress forces on the rod 12. As the distortion of the cured adhesive is transmitted through the transition surface of the sleeve, the wave shape of the surface acts to smooth out the distortion of the adhesive material. Thus, the force is never concentrated at any particular point of the rod 12 in excess of the material strength of the rod 12 at such a point. Similarly, a transition surface 19 is defined between the annulus or wedge nearest to the closed end 33 between line b-b. Transitional surface 19 is similarity waved shaped, and approaches the outer surface 22 of the distal end of rod 12 asymptotically. Surface 19 is present in the present invention even for an embodiment comprising only a single wedge. The soft contours of the transition surfaces of the present invention distribute the forces acting on the rod 12 such that said forces do not exceed the material strength of the rod 12. There are no abrupt changes in curvature to create regions of high stress in the sucker rod 12, possibly resulting in rod failure. It should be appreciated that other embodiments of end fitting 30 may comprise one annulus, or may comprise more than two annuluses. In any case, such should be within the scope of the present invention and should not be viewed as a limitation thereof.

FIG. 4A illustrates another embodiment of an improved design for the end fitting 30. The end fitting 30, illustrated in FIG. 4A comprises two wedge areas, a top area or top wedge 72 and a bottom area or wedge 74. However, it should be appreciated that more than two wedge areas or just one wedge area can be utilized. The improved design comprises changes which increase the area filled with adhesive and changes the sloping angle of the outer wall of the annulus. Thus, increasing the size of the wedge or wedges formed when the cured adhesive is set by pulling the rod after the rod and fitting assembly. It has been found, through experimentation and actual field use data, that these design changes have increased the life of the rod and end fitting bond as well as preventing pre-mature failure in the field. In the improvement, any or all of the wedge designs can be altered. However, it is foreseeable that only the top wedge 72 is modified as field experimentation indicates that the highest stress concentration, from the negative loading, is typically at the top wedge 72.

Preferably, the modification of the wedges will produce a back relief at transition surface 19. This back relief, provided by the increased surface area of the wedge, will act as a shock absorber for the forces generated by the negative loading as the rod is pushed downwards.

Typically in prior designs, the wedge wall or annular surface 70 was defined by a circle radius of about six inches (6"). However, it was found that by increasing the radius to approximately twenty inches (20"), there was a sufficient increase in the annulus 26 area to provide for a more substantial wedge during the setting of the rod and the end fitting. The increase in radius gives the wedge more length and surface area thus providing for a more substantial wedge, particularly on the backside (the side of the wedge closet to the rod end 60) where the wedge must grip in tension as well as resist the compressive forces of any negative loading. Further, this increase in the radius allows for the ever important asymptotical relationship which provides for the smooth transition between the annuluses as described hereinabove. This radial increase softens the curve for am more asymptotical relationship. Still further, the diameter 76 of the upper wedge 72 has preferably been increased from about twenty seven inches (27") to about thirty eight inches (38") due to the change in the circle radius. It should be appreciated that the upper wedge 72 diameter is dependent primarily on the size (diameter) of the end fitting 30. Thus, the diameter 76 may be larger or smaller than thirty-eight inches (38") depending in the initial size of the end fitting 30 and the diameter of the rod 12 onto which the end fitting 30 will be mounted.

Preferably, to construct the profile of the internal chamber, of the end fitting, more exact machining is required to provide the area for the wedges. As an example, not intended as limiting, it is preferred to first drill a pilot hole, for the chamber 32, in the end fitting. Preferably, the pilot hole is slightly undersized to provide for a more accurate centering hole 37 at the end of the fitting 30, which meets with the rod end 60. It should be appreciated that the proper location of the centering hole 37, provides for a more symmetrical wedge during assembly. Further, the centering hole 37 is preferably drilled so as to create straighter or more parallel angles at the end of the centering hole 37. These angles preferably provide for increased surface area at the end of the centering hole 37 and thus provide a better gripping area for the rod to end fitting connection as well as provide a more accurate centering between the rod and the end fitting. As described herein, the preferable method of initially attaching the end fitting 30 to the rod 12 involves spinning the end fitting onto the rod to displace the uncured adhesive and properly center the end fitting 30 on the rod 12. Thus, it should be appreciated that the proper cutting of the centering hole 37 is an important step to ensure a proper end fitting 30 to rod 12 connection. After the centering hole 37, has been properly cut, machining steps are carried out to cut the various angles and radii of the wedge areas.

It should be appreciated that although the preferable tolerancing for the circle radius and the diameter of the annuluses is plus/minus three thousandths (+/−0.003), a variety of tolerancing may be employed depending on personal preferences and machine and operator capabilities and should be viewed as being within the scope of this invention. It should further be seen that the radius sizes and ranges are provided herein as an example and for reference and as such changes of the circle radius, outside of the examples given herein, should not be viewed as a departure from the teachings herein. Still further, it should be understood that the end fittings described herein, can be utilized in conjunction with any sucker rods of any lengths and should not viewed as a limitation therein.

Referring again to FIG. 1, preferably, a continuous sucker rod 12 is flexible enough to be wound on a large diameter reel in order to transport the continuous sucker rod 12 from the manufacturing facility to the field for insertion into the wellbore 8. It will be understood that certain cross-sectional shapes such as diamond shape or other polygonal shapes will facilitate spooling a continuous rod into a tighter diameter thus improving the transportability and use of the continuous rod. It should be appreciated, by those in the art, that a continuous sucker rod 12 would reduce the overall weight of the sucker rod string, since most of the metal end fittings 30 are eliminated, and would reduce the handling time in that numerous shorter lengths of sucker rods would not need to be attached, end to end, before, or as, the sucker rod 12 is lowered into the wellbore 8. It should be further appreciated that the reels of the coiled continuous sucker rod 12 could be unloaded in the field for insertion into the wellbore 8, or the reels could be mounted on a trailer such that the continuous sucker rod 12 would be uncoiled from the reel, which is mounted on the trailer, and inserted directly into the wellbore 8. It is envisioned that a variety of methods could be utilized to uncoil the continuous sucker rod 12 and insert the rod 12 into the wellbore. Such methods would save expensive rig downtime that is consumed when connecting a plurality of conventional sucker rods, end to end, or when having to pull the sucker rod string 12a and/or downhole pump 14 out of the wellbore.

Figure 1A:
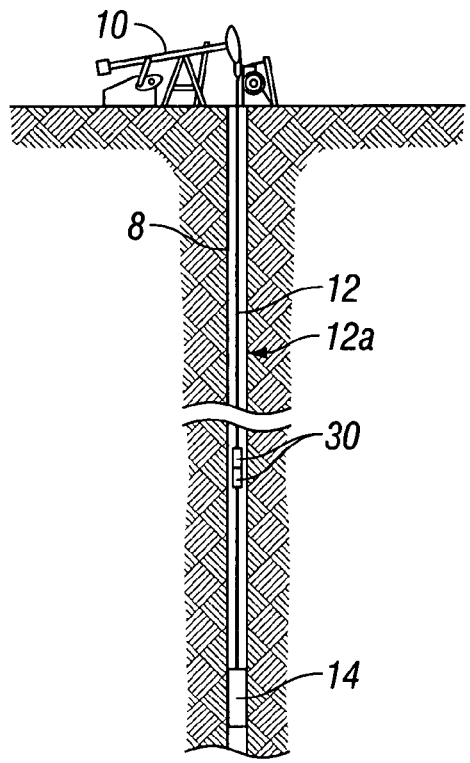
FIG. 1A illustrates a side elevated view partially in cross-section of a wellbore having a sucker rod string comprising more than one rod attached between a pump and a pump drive according to the present invention.

FIG. 1A illustrates another embodiment, wherein the continuous sucker rod string 12a comprises more than one continuous sucker rod 12. Preferably, each continuous sucker rod 12 ranges in length from 1500 feet to 2000 feet. However, it should be appreciated that longer or shorter lengths may be used and the choice of length may depend on factors such as, but not limited to, specific applications, size limitations of continuous rod reels, transportation costs and availability, and preferences of well operators and/or owners. The continuous sucker rods 12 are preferably attached together using end fittings 30 (see FIG. 4) which are described in more detail herein. It should be appreciated, by those in the art, that a sucker rod string 12a that comprises more than one continuous rod 12 instead of a single continuous rod 12 will still result in reduced rod string weight as well as result in faster installations. Even in very deep wells, the number of continuous sucker rods 12 required to reach between the downhole pump 14 and the pump drive 10 will be substantially less than when utilizing conventional sucker rods which may be approximately 37 feet in length and thus substantially reducing the number of end fittings 30 required to assemble the individual rods into a rod string 12a.

Referring to both FIGS. 1 and 1A, Typically, the sucker rod 12 is connected to the pump drive 10 by a polished rod (not illustrated). Preferably, the sucker rod 12 is adapted with an end fitting 30 (FIG. 4) wherein one end of the end fitting 30 is attached to the sucker rod 12 and the other end is adapted for connection to the polished rod. At the downhole end, near the sub-surface pump 14, of the sucker rod 12, another end fitting 30 is attached, at one end, to the sucker rod 12. The second end of the end fitting 30 is preferably adapted for attachment to sinker bars (not illustrated). Although a variety of end fittings 30 may be used, the preferred end fitting 30 is illustrated in FIGS. 4 and 4A. It should be appreciated that when more than one continuous sucker rod 12 or conventional length sucker rods 12 are being utilized, additional end fittings 30 are preferably used to connect subsequent ends 60 of the sucker rod 12 to assemble the continuous sucker rod string 12a. Preferably, the sinker bars serve to help the sucker rod 12 and the pump 14, if attached below the sinker bars, lower through the wellbore. The sinker bars may further aid in the prevention of the buckling of the sucker rod string 12a as well as stretch the sucker rod string 12a so as to allow a greater stroke at the bottom of the string 12a than at the surface. The use and selection of the sinker bars, as well as the polished rod, is well known, in the art, and is not further described herein.

FIG. 7 illustrates a section of one embodiment of a continuous sucker rod 12. Preferably, the sucker rod 12 is manufactured by arranging a plurality of glass fiber rovings in a substantially longitudinal direction 16. However, it should be appreciated that fiber rovings, and/or glass fiber mats can be arranged in such a way as to have longitudinally aligned fibers 16 and transversely aligned fibers 18. The longitudinally aligned fibers 16 provide substantial tensile strength to the sucker rod 12. The transversely aligned fibers provide substantially more compressive strength to the sucker rod 12. As is well known, in the art, the sucker rod 12 will stretch and then return to its normal position as the pump drive 10 lifts or pulls on the sucker rod string 12a during the pumping cycle. This stretching and relaxing, of the rod 12, allows the pump stroke, at the downhole pump 14, to be longer than the stroke at the pump drive 10. Thus, the longitudinally aligned fibers 16 preferably provide the required strength, to maintain the rod integrity, as the pump drive 10 moves the sucker rod 12 in a longitudinal direction towards the pump 14 or away from the pump. It should be appreciated that the addition of the transverse fibers 18 may not be required if the primary stress is along the longitudinal axis of the sucker rod 12. However, such fibers 18 may be necessary for certain applications and should be deemed within the scope of this invention. It should be understood that throughout the specification, the sucker rod 12 is referred to as a fiberglass sucker rod 12 utilizing glass fibers or glass fiber mats. However, the use of other fibers, organic and inorganic, including composites, would be within the scope of this invention and should not be viewed as a limitation thereof.

Referring now to FIG. 6, the glass fibers, rovings, or mats, generally illustrated as 40, are aligned preferably in a longitudinal direction (FIG. 5) but may be aligned in the transverse direction if desired. The fibers 40 are then wetted in a resin bath 42. It should be understood that process for manufacturing the continuous sucker rod 12 described herein is the substantially the same if the fibers are arranged substantially in the longitudinal direction or both in the longitudinal direction and the transverse direction. Preferably, the resin 15 is a type of thermosetting resin, however, other resins or adhesives may be used. FIG. 5 illustrates the resin 15, occupying the spaces between the fibers 40. After the fibers 40, have been wetted in the resin bath 42, they are pulled through at least one die 43. The die 43 preferably forms the wetted fibers 40 into the desired cross section. It should be appreciated that the desired cross-sectional shape may be of substantially any desired cross-section such as, but not limited to, circular, elliptical, rectangular, square, triangular, octagonal, other polygonal shape, or a variety of other shapes. However, the preferred cross-sectional shape is a substantially polygonal shape which may be referred to, by those in the art, as diamond shaped (FIG. 5A, designated as 112). It should be further appreciated that the die 43 may be a cold die or it may be a heated die, wherein a heated die would begin the cure of the shaped fiber rod 12 as it passes through the die 43. The rod 12 is further cured as it passes the die 43 through heating areas, or curing ovens 45. It should be understood that the die 43 and heating areas, or curing ovens 45 may be two separate units, or may be a single unit, wherein the rod 12 is shaped by the die 43, and cured at substantially the same time.

It should also be appreciated that the rod 12 can also be hollow. A hollow rod can be used for many applications including, but not limited to, carry cables to transmit signals between the surface and downhole, allow fluid production in the hollow core to eliminate associated problems, allow the pumping of inhibitors or other chemicals downhole, to allow greater flexibility of the continuous rod 12 (such as for winding on reels, or to add weight to the string by placing weighted material into the hollow core.

It should be understood that the continuous sucker rod 12 is not cut into the more conventional lengths of approximately thirty-seven (37) feet but may be pulled to substantially any predetermined length such as, but not limited to ten thousand (10,000) feet to fifteen thousand (15,000) feet or longer for a single continuous rod 12 or can be between one thousand five hundred (1,500) feet and two thousand (2000) feet for the continuous rods 12 which will be attached together (via end fittings 30). It should be understood, as discussed herein above that longer or shorter lengths can be pulled as may be necessitated by a particular application.

The cured sucker rod 12 can now be wound onto one or more large diameter reels 50. It should be appreciated that the diameter of the reel 50 should be of a size such that the continuous fiber or composite rod 12 is not damaged or broken during the winding process onto the reel 50. Thus, the diameter of the reel 50 should be large enough such that the minimum bending radius of the sucker rod is not exceeded during the winding operation. The manufactured and coiled continuous sucker rod 12 can thereafter be transported to the field or stored for future use. It should be understood by those skilled in the art of composite or fiberglass rod manufacturing, that the continuous sucker rod 12 can be manufactured in a variety of lengths. It is contemplated that the continuous sucker rod 12 will be manufactured for specific depths or maybe pre-manufactured and cut to a desired length by a cutter, illustrated in FIG. 3 as element 48. It is contemplated that more than one continuous sucker rod 12 can be joined together when it may be infeasible to transport a single reel of continuous sucker rod 12 to a particular location. In such application, the addition of an intermediate end fitting 30 would still provide a measurable savings in weight and expense of installation. It should thus be further appreciated that a variety of different cross sectional configurations, including hollow cores, as well as sucker rod strings comprised of more than one continuous sucker rod joined together are also within the scope of this invention and should not be viewed as a limitation thereof.

As is well known in the art, the length of the sucker rod string 12a, adds significant weight to the end fitting 30 nearest to the surface. The preferred end fitting 30 will remain attached to the sucker rod string 12a and will not transmit destructive forces to the sucker rod string 12a, despite the significant weight, due to the tapering design of the of the end fitting annuluses and the wedges formed therein. From the foregoing, it should be appreciated, by those skilled in the art, that the preferred end fittings 30 allow for a significantly long continuous sucker rod 12, in excess of 10,000 to 15,000 feet, to be utilized to actuate a downhole pump 14, without separation of the rod 12 and the end fittings 30 or destruction of the rod 12 by forces transmitted from the end fittings 30 to the rod.

FIG. 7 illustrates an alternative embodiment of the continuous sucker rod 12 designated, for clarity as 12b. As illustrated in FIG. 7, the continuous sucker rod 12b is tapered such that the outside diameter, of the continuous rod 12b, is larger at the end 22, near the surface and pump drive 10, and is of a smaller outside diameter at the lower end 24, which is near the sub-surface pump 14. As is known in the art, the upper end of a sucker rod string 12b typically must support more weight than the lower end due to the total weight of the string required to reach from a pump drive 10 to the sub-surface pump 14. The continuous sucker rod 12b, with a larger upper end 22 will thus allow for the support of greater weight (and thus greater lengths) of a continuous sucker rod 12b. It should be understood that the embodiment, illustrated in FIG. 7, requires different size end fittings 30a, 30b for the upper end 22 and the lower end 24 because of the differing outside diameters of the upper 22 and lower 24 sucker rod ends. It should be further understood that if the sucker rod string 12a comprises more than one continuous rod, the respective upper and lower ends 60 of each rod section would be of differing diameters but preferably the entire sucker rod string 12a would be tapered from the end nearest the surface to the end nearest the sub-surface pump 14. Still further, it is envisioned that even sucker rod strings 12a which comprise a multitude of individual sucker rods, such as but not limited to rods being approximately 37 feet in length, which are connected together with a plurality of end fittings, could be tapered from the upper end to the lower end. In such an embodiment, each rod 12 would preferably have at least a slight taper, in the downhole direction. Thus, each sucker rod 12 may be of a slightly different upper and lower diameter. However, a more realistic situation would call for the overall string taper to be achieved by tapering long sections of the string wherein a section may comprise several thousand feet of sucker rod 12 being of a certain selected diameter and then having a subsequent lower section of the sucker rod 12 string being of a slightly smaller diameter.

It will be understood that certain features and sub-combinations are of utility and may be employed without reference to other features and sub-combinations. This is contemplated by and is within the scope of the claims. It may be seen from the preceding description that a novel combination of a sucker rod 12, including a continuous sucker rod, and an end fitting 30 that resists de-bonding and provides for a sucker rod 12 having a sufficient diameter but no joints, if continuous, has been provided. Further, an improved design of the end fitting 30 has been provided along with methods for the preparation and assembly of the rods 12 with the end fittings 30. Although specific examples may have been described and disclosed, the invention of the instant application is considered to comprise and is intended to comprise any equivalent structure and may be constructed in many different ways to function and operate in the general manner as explained hereinbefore. Accordingly, it is noted that the embodiments described herein in detail for exemplary purposes are of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A method for assembling a sucker rod body and end fitting comprising the steps of:
   providing at least one end fitting having an interior surface and an exterior surface said interior surface defining a rod receptacle having a closed axially inner end and an open axially outer end, said interior surface defining at least one integrally formed, outwardly converging, axially aligned annulus, said annulus approaching the rod asymptotically and being tapered to be of decreasing diameter towards said open end, and defining a transition surface between said annulus and said open end, wherein said transition surface comprises a continuous function surface having no abrupt change in curvature;

coating said interior surface of said end fitting so as to prevent bonding with an adhesive;

providing an elongate sucker rod body having a longitudinal axis and a non-round uniform cross-sectional configuration in a plane perpendicular to said longitudinal axis, a first end, a second end, and an exterior surface, wherein said at first end and/or second end are configured for mating with said at least one end fitting;

removing, at least partially, the exterior surface proximate said first end and/or said second end of said rod body;

removing surface contaminants from said first end and/or said second end, of said rod body wherein said removal provides for a better bond;

marking said rod body proximate said first end and/or second end at a pre-determined position, wherein said marking provides visual indication of a proper set;

inserting adhesive into said rod receptacle of said end fitting;

inserting said non-round cross-sectional configuration of said rod body into said adhesive filled end fitting; wherein said end fitting is mounted on said rod body, and wherein mounting said at least one end fitting further comprises the step of flowably inserting a body of an initially flowable adhesive that cures to bond to an outer surface of said first end of said rod and to solidify to form at least one wedge to maintain attachment of said end fitting with said rod;

heat treating rod body with end fitting, wherein said heat treatment bonds adhesive to the rod body; and setting the wedges, wherein said setting causes the at least one wedge to create a mechanical stop to prevent the separation of the end fitting from the rod body.

2. The method of claim 1, further comprises the step of inspecting installation of the end fitting to ensure that the end fitting is proximate said marking.

3. A method for assembling a sucker rod body and end fitting comprising the steps of:

providing at least one end fitting having an interior surface and an exterior surface said interior surface defining a rod receptacle having a closed axially inner end and an open axially outer end, said interior surface defining at least one integrally formed, outwardly converging, axially aligned annulus, said annulus approaching the rod asymptotically and being tapered to be of decreasing diameter towards said open end, and defining a transition surface between said annulus and said open end, wherein said transition surface comprises a continuous function surface having no abrupt change in curvature;

providing an elongate sucker rod body having a longitudinal axis and a uniform non-round cross-sectional configuration in a plane perpendicular to said longitudinal axis, a first end, a second end, and an exterior surface, wherein said at first end and/or second end are configured for mating with said end fitting;

applying adhesive to the interior of said rod receptacle;

inserting said non-round cross-sectional configuration of said rod body into said adhesive filled end fitting, whereby said end fitting is mounted on said rod body; and heat treating rod body with end fitting, wherein said heat treatment bonds adhesive to the rod body.

4. The method of claim 3, further comprising the step of coating said interior surface of said end fitting with a mold release agent so as to prevent bonding with an adhesive.

5. The method of claim 4, wherein the coating of said interior further comprises the step of curing the coating of the interior of the end fitting to prevent bonding.

6. The method of claim 3, further comprising the step of removing, at least partially, the exterior surface proximate said first end and/or said second end.

7. The method of claim 3, further comprising the step of removing surface contaminants from said first end and/or said second end.

8. The method of claim 3, further comprising the step of marking said rod body proximate said first end and/or second end at a pre-determined position.

9. The method of claim 8, further comprising the step of inspecting installation of the end fitting to ensure that the end fitting is proximate said marking.

10. The method of claim 3, wherein mounting said at least one end fitting further comprises the step of flowably inserting a body of an initially flowable adhesive that cures to bond to an outer surface of said first end and/or second end of said rod and to solidify to form at least one wedge to maintain attachment of said end fitting with said rod.

11. The method of claim 10, further comprising the step of setting the wedge, wherein the setting comprises pulling the end fitting away from the first end and/or second end of the rod and/or pulling the first end and/or second end away from the end fitting.

12. The method of claim 3, wherein said rod receptacle has a plurality of integrally formed, outwardly converging, axially aligned annuluses, and wherein each said annulus approaches the rod asymptotically and being tapered to be of decreasing diameter towards said open end, and defining a separate transition surface between adjacent annuluses included in said plurality of annuluses, each said transition surface comprising a continuous function surface having no abrupt change in curvature.

* * * * *